(12) United States Patent
Guo et al.

(10) Patent No.: US 12,002,473 B2
(45) Date of Patent: Jun. 4, 2024

(54) VOICEPRINT RECOGNITION METHOD, APPARATUS AND DEVICE, AND STORAGE MEDIUM

(71) Applicant: PING AN TECHNOLOGY (SHENZHEN) CO., LTD., Shenzhen (CN)

(72) Inventors: Yuechao Guo, Shenzhen (CN); Yixuan Qiao, Shenzhen (CN); Yijun Tang, Shenzhen (CN); Jun Wang, Shenzhen (CN); Peng Gao, Shenzhen (CN); Guotong Xie, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 337 days.

(21) Appl. No.: 17/617,314

(22) PCT Filed: Dec. 24, 2020

(86) PCT No.: PCT/CN2020/111464
§ 371 (c)(1),
(2) Date: Dec. 8, 2021

(87) PCT Pub. No.: WO2021/217979
PCT Pub. Date: Nov. 4, 2021

(65) Prior Publication Data
US 2022/0254349 A1     Aug. 11, 2022

(30) Foreign Application Priority Data
Apr. 28, 2020   (CN) .......................... 202010350084.7

(51) Int. Cl.
G10L 17/02     (2013.01)
G10L 17/06     (2013.01)
(Continued)

(52) U.S. Cl.
CPC .............. *G10L 17/02* (2013.01); *G10L 17/06* (2013.01); *G10L 17/10* (2013.01); *G10L 17/18* (2013.01);
(Continued)

(58) Field of Classification Search
CPC ......... G10L 17/02; G10L 17/06; G10L 17/10; G10L 17/18; G10L 17/20; G10L 25/18; G10L 25/30
(Continued)

(56) References Cited

U.S. PATENT DOCUMENTS

| | | | | |
|---|---|---|---|---|
| 8,316,237 B1 * | 11/2012 | Felsher | ................. | H04L 63/061 380/282 |
| 2022/0254349 A1 * | 8/2022 | Guo | ........................ | G10L 17/02 |
| 2022/0254350 A1 * | 8/2022 | Guo | ........................ | G10L 17/02 |

FOREIGN PATENT DOCUMENTS

| | | | | |
|---|---|---|---|---|
| CN | 106448684 A | * | 2/2017 | ............. G10L 17/04 |
| CN | 106448684 A | | 2/2017 | |

(Continued)

*Primary Examiner* — Edwin S Leland, III (57) ABSTRACT

A voiceprint recognition method includes: obtaining a target speech information set to be recognized that includes speech information corresponding to at least one object; extracting target feature information from the target speech information set by using a preset algorithm, and optimizing the target feature information based on a first loss function to obtain a first voiceprint recognition result; obtaining target speech channel information of a target speech channel, where the target speech channel information includes channel noise information, and the target speech channel is used to transmit the target speech information set; extracting target feature vectors in the channel noise information, and optimizing the target feature vectors based on a second loss function to obtain a second voiceprint recognition result; and
(Continued)

fusing the first voiceprint recognition result and the second voiceprint recognition result to determine a final voiceprint recognition result.

20 Claims, 4 Drawing Sheets

(51) Int. Cl.
    *G10L 17/10*     (2013.01)
    *G10L 17/18*     (2013.01)
    *G10L 17/20*     (2013.01)
    *G10L 25/18*     (2013.01)
    *G10L 25/30*     (2013.01)

(52) U.S. Cl.
    CPC .............. *G10L 17/20* (2013.01); *G10L 25/18* (2013.01); *G10L 25/30* (2013.01)

(58) Field of Classification Search
    USPC .......................................................... 704/246
    See application file for complete search history.

(56) References Cited

FOREIGN PATENT DOCUMENTS

| | | | | | |
|---|---|---|---|---|---|
| CN | 108877809 | A | * | 11/2018 | ........... G10L 17/005 |
| CN | 108877809 | A | | 11/2018 | |
| CN | 109285538 | A | | 1/2019 | |
| CN | 109285538 | A | * | 1/2019 | ............. G10L 15/04 |
| CN | 109559749 | A | * | 4/2019 | ............. G10L 15/06 |
| CN | 109559749 | A | | 4/2019 | |
| CN | 110232928 | A | * | 9/2019 | ............. G10L 17/00 |
| CN | 111312283 | A | * | 6/2020 | ......... G10L 21/0208 |
| CN | 111524524 | A | | 8/2020 | |
| CN | 110232928 | B | * | 5/2021 | ............. G10L 17/00 |
| KR | 100776803 | B1 | | 11/2007 | |
| KR | 100776803 | B1 | * | 11/2007 | ............. G10L 17/22 |

* cited by examiner

FIG. 5 phone # VOICEPRINT RECOGNITION METHOD, APPARATUS AND DEVICE, AND STORAGE MEDIUM

CROSS REFERENCE TO THE RELATED APPLICATIONS

This application is the national phase entry of International Application No. PCT/CN2020/111464, filed on Dec. 24, 2020, which is based upon and claims priority to Chinese Patent Application No. 202010350084.7, filed on Apr. 28, 2020, the entire contents of which are incorporated herein by reference.

TECHNICAL FIELD

The present application relates to the field of voiceprint recognition technologies of artificial intelligence, and in particular, to a voiceprint recognition method, apparatus and device, and a storage medium.

BACKGROUND

Voiceprint recognition is a biological recognition technology, also known as speaker recognition, which is divided into speaking object recognition and speaking object identification. Currently, commonly used voiceprint recognition systems include a conventional feature engineering-based i-vector shallow network system and an x-vector deep network system, as well as an end-to-end d-vector deep network system which is the mainstream in recent years, etc. These systems solve the recognition problem by capturing long-term features of a speaking object's speech and encoding the long-term features into a low-dimensional vector representation. Specifically, speech information of speaking objects is embedded layer by layer through a network to finally obtain a vector with a fixed number of dimensions (such as 512 dimensions), and then a cosine similarity between vector representations of different speaking objects is calculated to complete identification confirmation and other operations on the speaking objects.

The inventor realized that a current end-to-end voiceprint recognition system, such as the Google's GE2E system, can perfectly implement training and inference of end-to-end voiceprint tasks, but loss functions of these systems do not deal with noise in channel information of sound. As a result, relevant information of channels cannot be perceived during training of a deep network, and accuracy of recognizing voiceprint information after training of the deep network is low.

SUMMARY

A main objective of the present application is to address low recognition accuracy in a voiceprint recognition process.

To achieve the foregoing objective, according to a first aspect of the present application, a voiceprint recognition method is provided, including: obtaining a target speech information set to be recognized, where the target speech information set includes speech information corresponding to at least one object, and the speech information is obtained after preprocessing; extracting target feature information from the target speech information set by using a preset algorithm, and optimizing the target feature information based on a first loss function to obtain a first voiceprint recognition result; obtaining target speech channel information of a target speech channel, where the target speech channel information includes channel noise information, and the target speech channel is used to transmit the target speech information set; extracting target feature vectors in the channel noise information, and optimizing the target feature vectors based on a second loss function to obtain a second voiceprint recognition result; and fusing the first voiceprint recognition result and the second voiceprint recognition result to determine a final voiceprint recognition result.

According to a second aspect of the present application, a voiceprint recognition device is provided, including: a memory, a processor and computer-readable instructions stored in the memory and executable on the processor, where the processor implements the following steps when executing the computer-readable instructions: obtaining a target speech information set to be recognized, where the target speech information set includes speech information corresponding to at least one object, and the speech information is obtained after preprocessing; extracting target feature information from the target speech information set by using a preset algorithm, and optimizing the target feature information based on a first loss function to obtain a first voiceprint recognition result; obtaining target speech channel information of a target speech channel, where the target speech channel information includes channel noise information, and the target speech channel is used to transmit the target speech information set; extracting target feature vectors in the channel noise information, and optimizing the target feature vectors based on a second loss function to obtain a second voiceprint recognition result; and fusing the first voiceprint recognition result and the second voiceprint recognition result to determine a final voiceprint recognition result.

According to a third aspect of the present application, a computer-readable storage medium is provided, where the computer-readable storage medium stores computer instructions, and when the computer instructions are run on a computer, the computer is enabled to perform the following steps: obtaining a target speech information set to be recognized, where the target speech information set includes speech information corresponding to at least one object, and the speech information is obtained after preprocessing; extracting target feature information from the target speech information set by using a preset algorithm, and optimizing the target feature information based on a first loss function to obtain a first voiceprint recognition result; obtaining target speech channel information of a target speech channel, where the target speech channel information includes channel noise information, and the target speech channel is used to transmit the target speech information set; extracting target feature vectors in the channel noise information, and optimizing the target feature vectors based on a second loss function to obtain a second voiceprint recognition result; and fusing the first voiceprint recognition result and the second voiceprint recognition result to determine a final voiceprint recognition result.

According to a fourth aspect of the present application, a voiceprint recognition apparatus is provided, including: a first obtaining module, configured to obtain a target speech information set to be recognized, where the target speech information set includes speech information corresponding to at least one object, and the speech information is obtained after preprocessing; a first optimization module, configured to extract target feature information from the target speech information set by using a preset algorithm, and optimize the target feature information based on a first loss function to obtain a first voiceprint recognition result; a second obtaining module, configured to obtain target speech channel information of a target speech channel, where the target speech channel information includes channel noise information, and the target speech channel is used to transmit the target speech information set; a second optimization module, configured to extract target feature vectors in the channel noise information, and optimize the target feature vectors based on a second loss function to obtain a second voiceprint recognition result; and a fusion module, configured to fuse the first voiceprint recognition result and the second voiceprint recognition result to determine a final voiceprint recognition result.

In the technical solution according to the present application, a target speech information set to be recognized is obtained, where the target speech information set includes speech information corresponding to at least one object, and the speech information is obtained after preprocessing; target feature information is extracted from the target speech information set by using a preset algorithm, and the target feature information is optimized based on a first loss function to obtain a first voiceprint recognition result; target speech channel information of a target speech channel is obtained, where the target speech channel information includes channel noise information, and the target speech channel is used to transmit the target speech information set; target feature vectors in the channel noise information are extracted, and the target feature vectors are optimized based on a second loss function to obtain a second voiceprint recognition result; and the first voiceprint recognition result and the second voiceprint recognition result are fused to determine a final voiceprint recognition result. In the embodiments of the present application, a server performs loss optimization processing on the target speech information set and the target speech channel information, and then fuses the first voiceprint recognition result and the second voiceprint recognition result that are obtained after loss optimization processing, so that a deep network learns a method for eliminating speech channel noise and improves accuracy of voiceprint recognition.

DETAILED DESCRIPTION OF THE EMBODIMENTS

Embodiments of the present application provide a voiceprint recognition method, apparatus and device, and a storage medium. Loss optimization processing is performed on a target speech information set and target speech channel information, and then a first voiceprint recognition result and a second voiceprint recognition result that are obtained after loss optimization processing are fused, so that a deep network learns a method for eliminating speech channel noise and improves accuracy of voiceprint recognition.

Terms "first", "second", "third", "fourth", etc. (if any) in the specification, claims, and accompanying drawings of the present application are used to distinguish between similar objects without having to describe a specific order or sequence. It should be understood that data used in this way may be interchanged under appropriate circumstances, so that the embodiments described herein can be implemented in an order other than that illustrated or described herein. In addition, the term "including" or "having" and any variants thereof are intended to cover non-exclusive inclusions. For example, a process, method, system, product, or device that includes a series of steps or units is not necessarily limited to those steps or units clearly listed, and may include other steps or units that are not clearly listed or are inherent to the process, method, product, or device.

Figure 1:
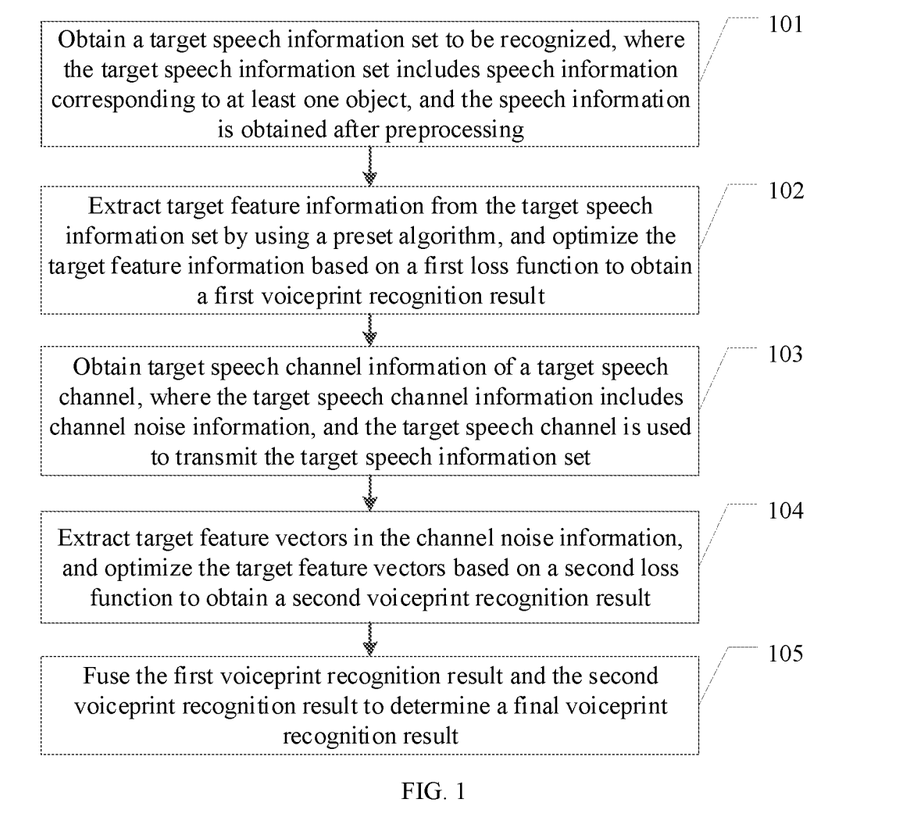
FIG. 1 is a schematic diagram of a voiceprint recognition method according to an embodiment of the present application.

For ease of understanding, a specific process of an embodiment of the present application is described below. Referring to FIG. 1, a voiceprint recognition method in an embodiment of the present application includes the following steps.

101: Obtain a target speech information set to be recognized, where the target speech information set includes speech information corresponding to at least one object, and the speech information is obtained after preprocessing.

It is understandable that an execution body of the present application may be a voiceprint recognition apparatus or a terminal or a server, which is not specifically limited herein. In this embodiment of the present application, that the server is the execution body is used as an example for description.

The server obtains the target speech information set to be recognized. The target speech information set herein includes the speech information corresponding to at least one object, and there may be one or more pieces of speech information for one object. The number of target objects and the number of pieces of speech information of the target objects are not limited herein. In addition, the speech information herein is obtained after preprocessing. It should be noted that to further ensure privacy and security of the target speech information set, the foregoing target speech information set may be further stored in a node of a blockchain.

It should be noted that the server needs to preprocess a speech signal of an object after receiving the speech signal and the preprocessed signal can be better analyzed, so that the server finally recognizes more accurate information. The preprocessing herein refers to pre-emphasis, framing and windowing. The purpose of these operations is to eliminate impact on speech signal quality caused by aliasing, distortion of high-order harmonic waves, high frequencies and other factors resulting from a human vocal organ and a device that collects speech signals. Trying the best to ensure more uniform and smoother signals obtained through subsequent speech processing can provide high-quality parameters for signal parameter extraction, and improve quality of speech processing.

102: Extract target feature information from the target speech information set by using a preset algorithm, and optimize the target feature information based on a first loss function to obtain a first voiceprint recognition result.

After obtaining the preprocessed target speech information set, the server extracts the target feature information of speech information from the target speech information set by using the preset algorithm, and optimizes the extracted target feature information based on the first loss function to obtain the first voiceprint recognition result.

It is understandable that a speech signal contains very rich feature parameters, and different feature vectors have different physical and acoustic meanings. The feature parameters extracted by the server are highly significant to the success or failure of a voiceprint recognition system. If appropriate feature parameters are selected, a recognition rate can be increased. Extracting target feature information is to remove or reduce to the largest extent impact of information irrelevant to recognition in a speech signal, reduce an amount of data to be processed in a subsequent recognition stage, and generate feature parameters that represent voiceprint recognition object information carried in the speech signal. According to different usages of speech features, different feature parameters need to be extracted to ensure accuracy of recognition. After extracting the target feature information, the server needs to calculate similarity matrices for the target feature information to obtain corresponding mapping information to make voiceprint recognition more accurate. Finally, the server uses the mapping information and the first loss function to optimize a loss to obtain the first voiceprint recognition result.

103: Obtain target speech channel information of a target speech channel, where the target speech channel information includes channel noise information, and the target speech channel is used to transmit the target speech information set.

The server obtains the target speech channel information of the target speech channel. The target speech channel herein is a channel for transmitting the target speech information set, and certain target speech channel information, i.e., noise information, is generated in the channel during transmission.

It is understandable that speech information of a voiceprint recognition object encounters certain noise impact (i.e., channel noise) during transmission in the channel. The channel noise may interfere with a communication effect, reduce communication reliability, and have major impact on a result of voiceprint recognition. Therefore, in the present application, the channel for transmitting speech information is processed in the process of voiceprint recognition to reduce noise interference.

104: Extract target feature vectors in the channel noise information, and optimize the target feature vectors based on a second loss function to obtain a second voiceprint recognition result.

After obtaining the target speech channel information in the target speech channel, the server extracts the target feature vectors in the channel noise information of the target speech channel, and optimizes the target feature vectors based on the second loss function to obtain the second voiceprint recognition result.

It should be noted that when the target speech channel information is optimized, in most signal processing theories, channel noise information in target speech channel information boils down to Gaussian white noise, which is prior information of the speech channel. Therefore, the second loss function used herein is minimum mean square error (MMSE). The MMSE is to minimize an expected value (mean) of the square of an error between a predicted value and a true value, so that the predicted value is as close to the true value as possible, and the difference between the predicted value and the true value is minimized. This algorithm enables a prediction model to have good accuracy for noisy data (maximum probability model), reaching $f(x) = y$. In the present application, channel noise in the target speech channel information is optimized, so that a deep network learns a method for eliminating speech noise and obtains more accurate voiceprint recognition information, i.e., the second voiceprint recognition result.

105: Fuse the first voiceprint recognition result and the second voiceprint recognition result to determine a final voiceprint recognition result.

The server fuses the obtained first voiceprint recognition result and second voiceprint recognition result to determine the final voiceprint recognition result. The server fuses the voiceprint information having undergone secondary optimization to obtain a more accurate voiceprint recognition result.

After optimizing the target channel speech information and the speech information of the voiceprint recognition object, the server substantially eliminates noise generated during recognition of the voiceprint information, and the server can clearly recognize the speech information of the voiceprint recognition object, and fuse the two types of speech information to obtain the final voiceprint recognition result.

In the embodiments of the present application, a server performs loss optimization processing on the target speech information set and the target speech channel information, and then fuses the first voiceprint recognition result and the second voiceprint recognition result that are obtained after loss optimization processing, so that a deep network learns a method for eliminating speech channel noise and improves accuracy of voiceprint recognition.

Figure 2:
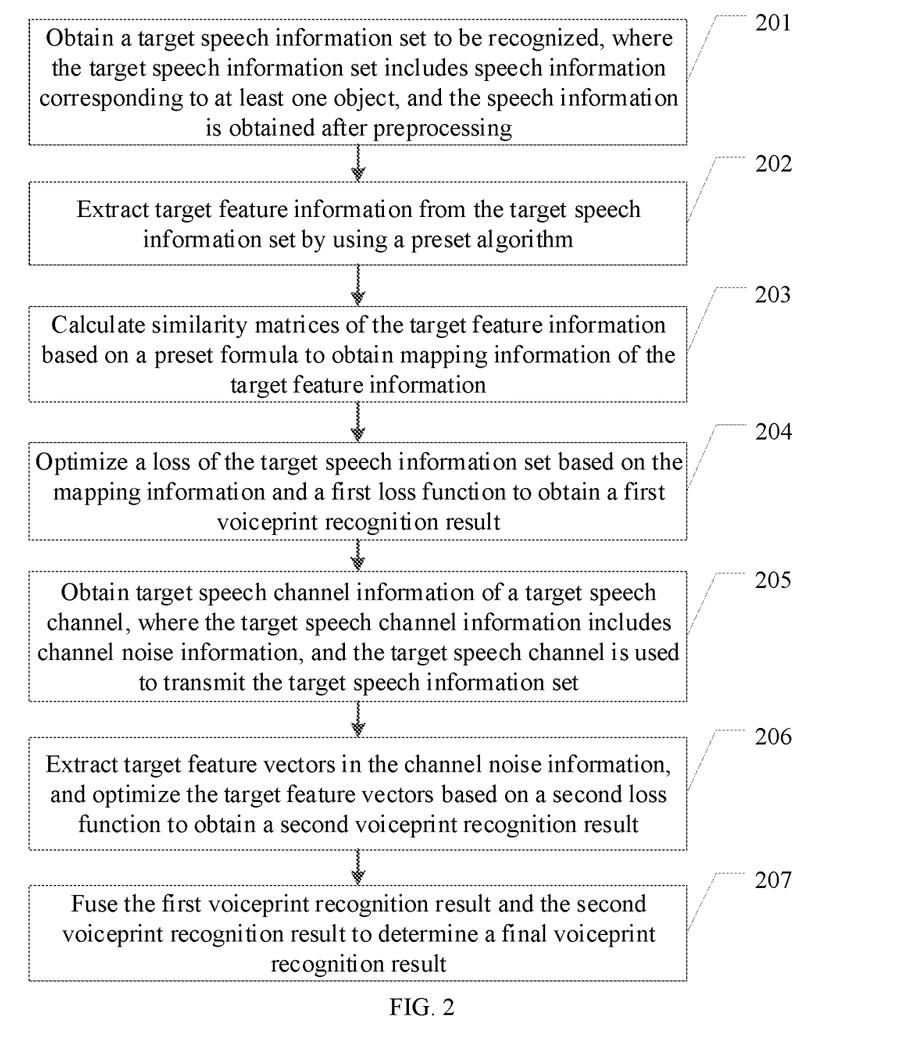
FIG. 2 is a schematic diagram of a voiceprint recognition method according to another embodiment of the present application.

Referring to FIG. 2, a voiceprint recognition method according to another embodiment of the present application includes the following steps.

201: Obtain a target speech information set to be recognized, where the target speech information set includes speech information corresponding to at least one object, and the speech information is obtained after preprocessing.

The server obtains the target speech information set to be recognized. The target speech information set herein includes the speech information corresponding to at least one object, and there may be one or more pieces of speech information for one object. The number of target objects and the number of pieces of speech information of the target objects are not limited herein. In addition, the speech information herein is obtained after preprocessing. Specifically:

the server first obtains to-be-processed speech information, and pre-emphasizes the to-be-processed speech information s(n) by using a preset processing formula to obtain processed speech information s'(n), where the preset processing formula is $s'(n)=s(n)-as(n-1)$, a is a pre-emphasis coefficient, and s(n−1) is a previous piece of speech information of the to-be-processed speech information; and then the server performs framing on the processed speech information, and windows each frame of processed speech information to finally obtain a target speech information set. The target speech information set herein includes speech information corresponding to at least one object, and there may be one or more pieces of speech information for one object.

It should be noted that the server needs to preprocess a speech signal of an object after receiving the speech signal and the preprocessed signal can be better analyzed, so that the server finally recognizes more accurate information. The preprocessing herein refers to pre-emphasis, framing and windowing. The purpose of these operations is to eliminate impact on speech signal quality caused by aliasing, distortion of high-order harmonic waves, high frequencies and other factors resulting from a human vocal organ and a device that collects speech signals. Trying the best to ensure more uniform and smoother signals obtained through subsequent speech processing can provide high-quality parameters for signal parameter extraction, and improve quality of speech processing.

It should be further noted that, the pre-emphasis herein refers to the following: When an average power spectrum of the speech signal s(n) is affected by glottal excitation and oronasal radiation, a high frequency end is attenuated by 6 dB/oct (octave) from about 800 Hz or above, and a higher frequency indicates a smaller corresponding component. Therefore, a high frequency part of the speech signal s(n) needs to be boosted before the speech signal is analyzed. A common measure is to use a digital filter to implement pre-emphasis. Output and input speech signals of a pre-emphasis network may be represented by using a preset processing formula: s'(n)=s(n)−as(n−1), where a is a pre-emphasis coefficient, and is generally 0.9, s(n−1) is a previous piece of speech information of the to-be-processed speech information, and s'(n) is the processed speech information. After the speech signal is emphasized, because the speech signal has time-varying characteristics, which remain substantially unchanged, i.e., relatively stable, in a short time range, it can be regarded as a quasi-steady state process, i.e., the speech signal has short-time stability. Therefore, the analysis and processing of any speech signal must be based on "a short time", i.e., "short-time analysis" is performed, and the speech signal is segmented to analyze its features parameters. Each segment is called a "frame" and the frame length is usually 10-30 ms. In this way, for the overall speech signal, a feature parameter time sequence composed of feature parameters of each frame is obtained through analysis. After framing, the server further needs to window the speech signal. The purpose of windowing is to emphasize a speech waveform near a sample and weaken the rest of the waveform. To process each short segment of the speech signal is actually to perform certain transformation or computation on each short segment. Three most commonly used window functions are a rectangular window, a Hamming window and a Hanning window. In the present application, a window function is not limited, and the window function may be selected based on an actual situation.

202: Extract target feature information from the target speech information set by using a preset algorithm.

After obtaining the target speech information set, the server extracts the target feature information from the target speech information set. Specifically:

the server first collects a speech sequence in the target speech information set by using the preset algorithm, and obtains an amplitude spectrum of the speech sequence; then, the server filters the amplitude spectrum of the speech sequence through a filter to obtain a filter output result of the speech sequence; and finally, the server performs discrete cosine transform on the filter output result of the speech sequence to obtain the target feature information.

Herein, the server uses a Mel frequency cepstrum coefficient (MFCC) to extract feature information, simulates a human ear's perception on speech at different frequencies based on the MFCC, and extracts the target feature information from the speech signal. Mel frequency is proposed based on human hearing characteristics, and is in a non-linear correspondence with Hz frequencies. The process of sound frequency distinguishing by the human ear is like an operation of taking a logarithm. For example, in a Mel frequency domain, human perception ability and tones are a linear relationship. If Mel frequencies of two segments of speech differ by two times, human perception also differs by two times. The MFCC is a Hz spectrum characteristic calculated by using this relationship. MFCC parameters are cepstrum feature parameters extracted from the Mel scale frequency domain based on human hearing characteristics by using a critical band effect of human hearing.

For example, the server first collects a speech sequence x[n] (n=1, 2, . . . , N−1) in the target speech information set by using the preset algorithm, and performs fast Fourier transform on the speech sequence:

$$X[k] = \sum_{n=0}^{N-1} x[n]e^{-j\frac{2\pi}{N}nk} \quad k = 0, 1, 2, \ldots, N-1,$$

where N is a frame length, j is an imaginary number, and X[k] is a complex number series of a point N; then the server performs a modulo operation on X[k] to obtain the amplitude spectrum of the speech sequence; next, the server configures a triangular filter bank, and calculates an output of each triangular filter after filtering of the signal amplitude spectrum to obtain the filter output result of the speech sequence:

$$F(l) = \sum_{k=f_c(l)}^{f_h(l)} w_l(k)|X[k]| \quad l = 1, 2, \ldots, L, \text{ where}$$

$$w_l(k) = \begin{cases} \frac{k - f_o(l)}{f_c(l) - f_o(l)}, & f_o(l) \le k \le f_c(l) \\ \frac{f_h(l) - k}{f_h(l) - f_c(l)}, & f_c(l) \le k \le f_h(l) \end{cases},$$

$$f_o(l) = \frac{o(l)}{\left[\frac{f_s}{N}\right]}, f_h(l) = \frac{h(l)}{\left[\frac{f_s}{N}\right]}, f_c(l) = \frac{c(l)}{\left[\frac{f_s}{N}\right]},$$

$w_l(k)$ is a filter coefficient of a filter corresponding to $$M(i) = \sqrt{\frac{2}{N}} \sum_{l=1}^{L} \log F(l) \cos\left[\left(l - \frac{1}{2}\right)\frac{i\pi}{L}\right] \quad i = 1, 2, \ldots, Q,$$

o(l), c(l), h(l) are a lower limit frequency, a center frequency and an upper limit frequency of the corresponding filter on an actual frequency coordinate axis, $f_o(l)$, $f_c(l)$, $f_h(l)$ are a lower limit frequency filter value, a center frequency filter value and an upper limit frequency filter value respectively, $f_s$ is a sampling rate, L is the total number of filters, l is a filter serial number, and N is the frame length; and finally, the server performs a logarithmic operation on all filter outputs, and then further performs discrete cosine transform to obtain the target feature information:

$$M(i) = \sqrt{\frac{2}{N}} \sum_{l=1}^{L} \log F(l) \cos\left[\left(l - \frac{1}{2}\right)\frac{i\pi}{L}\right] \quad i = 1, 2, \ldots, Q,$$

where Q is an order of the target feature information and is usually 13, L is the total number of the filters, l is the filter number, N is the frame length, and F(L) is the filter output result of the speech sequence. In this way, the target feature information is obtained.

203: Calculate similarity matrices of the target feature information based on a preset formula to obtain mapping information of the target feature information.

After extracting the target feature information from the target speech information set, the server calculates the similarity matrices of the target feature information based on the preset formula to obtain the mapping information of the target feature information. Specifically:

the server transforms the obtained target feature information into a low-dimensional vector, where the low-dimensional vector is a vector representing the target feature information in a low dimension; and the server calculates the similarity matrices of the target feature information based on the transformed low-dimensional vector and the preset formula to finally obtain the mapping information of the target feature information, where there are a plurality of similarity matrices herein, and objects for calculating the similarity matrices may be the same or different.

After extracting the target feature information, the server transforms the target feature information into the low-dimensional vector through an LSTM or another neural network, and uses the low-dimensional vector to represent the corresponding target feature information, and such a manner of transforming the target feature information into the low-dimensional vector facilitates calculation of the similarity matrices. The similarity matrices of the target feature information calculated by the server herein are similarity matrices between different speech information of the same voiceprint recognition object and similarity matrices between different voiceprint recognition objects, and after performing calculation on the plurality of similarity matrices, the server can perform loss optimization through the similarity matrices of each voiceprint recognition object.

204: Optimize a loss of the target speech information set based on the mapping information and a first loss function to obtain a first voiceprint recognition result.

The server optimizing the loss of the target speech information set based on the mapping information of the target feature information and the first loss function to obtain the first voiceprint recognition result.

For example, the server obtains three different voiceprint recognition objects that each have three pieces of different speech information, and preprocesses the speech information to obtain a target speech information set, and then the server calculates similarity matrices of the target feature information by using a preset formula to obtain mapping information of the target feature information, where the preset formula is as follows:

$$S_{ji,k} = \begin{cases} \omega \cdot \cos(e_{ji}, c_j^{(-i)}) + b & k = j \\ \omega \cdot \cos(e_{ji}, c_k) + b & \text{others} \end{cases},$$

where $S_{ji,k}$ denotes a target feature information similarity matrix of the $i^{th}$ piece of speech information of the $j^{th}$ voiceprint recognition object among the voiceprint recognition objects k, k denotes the voiceprint recognition object, $e_{ji}$ denotes the $i^{th}$ piece of speech information of the $j^{th}$ voiceprint recognition object, i.e., a low-dimensional vector obtained by transforming the target feature information, $\omega$ and b are variables obtained through massive training, M denotes the number of the voiceprint recognition objects, $c_j$ denotes a centroid (average value) of the remaining speech information of the $j^{th}$ voiceprint recognition object after removal of the $i^{th}$ piece of speech information, and a calculation formula is as follows:

$$c_j^{(-i)} = \frac{1}{M-1} \sum_{\substack{m=1 \\ m \neq i}}^{M} e_{jm},$$

where M denotes the number of the voiceprint recognition objects, $e_{jm}$ denotes the $m^{th}$ piece of speech information of the $j^{th}$ voiceprint recognition object, finally the server performs calculation on a first loss function and a mapping information optimization loss, and the first loss function is:

$$L(e_{ji}) = -S_{ji,j} + \log \sum_{k=1}^{N} \exp(S_{ji,k}),$$

where $S_{ji,j}$ is a similarity matrix between the $i^{th}$ piece of speech information of a voiceprint recognition object and other speech information of the voiceprint recognition object, $S_{ji,k}$ denotes a similarity matrix between speech information of the voiceprint recognition object and speech information of other voiceprint recognition objects, and N denotes the number of pieces of speech information of each voiceprint recognition object. In this way, the server calculates the first voiceprint recognition result.

205: Obtain target speech channel information of a target speech channel, where the target speech channel information includes channel noise information, and the target speech channel is used to transmit the target speech information set.

The server obtains the target speech channel information of the target speech channel. The target speech channel herein is a channel for transmitting the target speech information set, and certain target speech channel information, i.e., noise information, is generated in the channel during transmission.

It is understandable that speech information of a voiceprint recognition object encounters certain noise impact (i.e., channel noise) during transmission in the channel. The channel noise may interfere with a communication effect, reduce communication reliability, and have major impact on a result of voiceprint recognition. Therefore, in the present application, the channel for transmitting speech information is processed in the process of voiceprint recognition to reduce noise interference.

206: Extract target feature vectors in the channel noise information, and optimize the target feature vectors based on a second loss function to obtain a second voiceprint recognition result.

After obtaining the target speech channel information in the target speech channel, the server extracts the target feature vectors in the channel noise information of the target speech channel, and optimizes the target feature vectors based on the second loss function to obtain the second voiceprint recognition result. Specifically:

the server extracts the target feature vectors in the target speech channel information, and calculates an average value of the plurality of target feature vectors; and then the server calculates a minimum mean square error matrix of the target speech channel information based on the average value of the target feature vectors and the second loss function to obtain the second voiceprint recognition result.

It should be noted that the step of optimizing the target channel speech information is performed after optimization of the target speech information set. When the target speech information set starts to be optimized, because an average value is strongly random in network training, and an average value of optimized target channel speech information cannot be captured, it is necessary to perform training by performing a plurality of steps of optimizing the target speech information set before the step of optimizing the target channel speech information. In this case, a training network is stabilized and channel noise can be better captured. How many steps of optimizing the target speech information set are required needs to be analyzed based on a specific situation. For example: In the process of voiceprint recognition, when 10 W training steps are required for completing training on all training data, the optimization of the target channel speech information may start after 6 W training steps have been performed.

For example, after extracting the target feature vectors in the target speech channel information, the server uses the target feature vectors to calculate an average value of the target feature vectors. A formula for calculating the average value of the target feature vectors is:

$$LC_{j,t} = \beta LC_{j,t-1} + (1-\beta)\frac{1}{M}\sum_{i=1}^{M} e_{ji},$$

where $LC_{j,t}$ is an average value of target feature vectors in step t, $e_{ji}$ denotes the piece of speech information of the $j^{th}$ voiceprint recognition object, i.e., a target feature vector, $\beta$ denotes a weighting coefficient, M denotes the number of pieces of speech information of each voiceprint recognition object, and $LC_{j,t-1}$ is an average value of target feature vectors in step t−1; the server calculates a minimum mean square error matrix of the target speech channel information after calculating the average value of the target feature vectors, where a formula for calculating the minimum mean square error matrix is as follows:

$$MMSE_j = \mu \frac{1}{M}\sum_{i=1}^{M}(e_{ji} - LC_{j,t})^2 + \theta,$$

where $MMSE_j$ denotes the minimum mean square error matrix, $LC_{j,t}$ is the average value of the target feature vectors in step t, M denotes the number of pieces of speech information of each voiceprint recognition object, $e_{ji}$ denotes the $i^{th}$ piece of speech information of the $j^{th}$ voiceprint recognition object, $\mu$ denotes a scale factor, $\theta$ denotes a bias coefficient, where both coefficients are obtained through training, an initial value of $\mu$ is usually 1, and an initial value of $\theta$ is usually 0. In this way, the second voiceprint recognition result is obtained.

207: Fuse the first voiceprint recognition result and the second voiceprint recognition result to determine a final voiceprint recognition result.

The server fuses the obtained first voiceprint recognition result and second voiceprint recognition result to determine the final voiceprint recognition result. The server fuses the voiceprint information having undergone secondary optimization to obtain a more accurate voiceprint recognition result. Specifically:

the server obtains the first voiceprint recognition result and the second voiceprint recognition result; then the server fuses the first voiceprint recognition result and the second voiceprint recognition result by using a fusion formula to determine the final voiceprint recognition result, where the fusion formula is:

$$L = L_1 + \gamma(-L_2 \log \Sigma_{k=1}^{N} \exp(L_2)),$$

where L denotes the result after voiceprint recognition fusion, $L_1$ denotes the first voiceprint recognition result, $L_2$ denotes the second voiceprint recognition result, k denotes the voiceprint recognition object, and N denotes the number of pieces of speech information of each voiceprint recognition object.

After optimizing the target channel speech information and the speech information of the voiceprint recognition object, the server substantially eliminates noise generated during recognition of the voiceprint information, and the server can clearly recognize the speech information of the voiceprint recognition object, and fuse the two types of speech information to obtain the final voiceprint recognition result.

For example, after obtaining the first voiceprint recognition result and the second voiceprint recognition result, the server fuses the two results by using the fusion formula. The fusion formula is:

$$L = L_1 + \gamma(-L_2 + \log \Sigma_{k=1}^{N} \exp(L_2)),$$

where L denotes the final voiceprint recognition result after fusion, $L_1$ denotes the first voiceprint recognition result, $L_2$ denotes the second voiceprint recognition result, k denotes the voiceprint recognition object, N denotes the number of pieces of speech information of each voiceprint recognition object, and $\gamma$ denotes an adjustment factor. Expressions of the first voiceprint recognition result $L_1$ and the second voiceprint recognition result $L_2$ are learned based on step 204 and step 206 respectively, and the two expressions are brought into the fusion formula:

$$L(e_{ji}) = -S_{ji,j} + \log \Sigma_{k=1}^{N} \exp(S_{ji,k}) + \gamma(-MMSE_j + \log \Sigma_{k=1}^{N} \exp(MMSE_j)),$$

where $L(e_{ji})$ denotes a voiceprint recognition result of the $i^{th}$ piece of speech information of the $j^{th}$ voiceprint recognition object, $S_{ji,j}$ denotes a similarity matrix between the $i^{th}$ piece of speech information of a voiceprint recognition object and other speech information of the voiceprint recognition object, and $S_{ji,k}$ denotes a similarity matrix between speech information of a voiceprint recognition object and speech information of other voiceprint recognition objects, where $$S_{ji,k} = \begin{cases} \omega \cdot \cos(e_{ji}, c_j^{(-i)}) + b & k=j \\ \omega \cdot \cos(e_{ji}, c_k) + b & \text{others} \end{cases},$$

where k denotes the voiceprint recognition object, $e_{ji}$ denotes the $i^{th}$ piece of speech information of the $j^{th}$ voiceprint recognition object, i.e., a low-dimensional vector obtained by transforming the target feature information, $\omega$ and b are variables obtained through massive training, $c_j$ denotes a centroid (average value) of the remaining speech information of the $j^{th}$ voiceprint recognition objects after removal of the $i^{th}$ piece of speech information, and a calculation formula is as follows:

$$c_j^{(-i)} = \frac{1}{M-1}\sum_{\substack{m=1 \\ m \neq i}}^{M} e_{jm},$$

where M denotes the number of voiceprint recognition objects, $e_{jm}$ denotes the $m^{th}$ piece of speech information of the $j^{th}$ voiceprint recognition object, and N denotes the number of pieces of speech information of each voiceprint recognition object; γ denotes the adjustment factor, used to adjust a value of the loss function part of the overall $MMSE_j$; $MMSE_j$ denotes the minimum mean square error matrix, where the expression of $MMSE_j$ is as follows:

$$MMSE_j = \mu \frac{1}{M} \sum_{i=1}^{M} (e_{ji} - LC_j)^2 + \theta,$$

where μ denotes the scale factor, θ denotes the bias coefficient, M denotes the number of pieces of speech information of each voiceprint recognition object, $e_{ji}$ denotes the $i^{th}$ piece of speech information of the $j^{th}$ voiceprint recognition object, and $LC_{j,t}$ is the average value of the target feature vectors in step t, where the expression of $LC_{j,t}$ is as follows:

$$LC_{j,t} = \beta LC_{j,t-1} + (1-\beta)\frac{1}{M}\sum_{i=1}^{M} e_{ji},$$

where $e_{ji}$ denotes the $i^{th}$ piece of speech information of the $j^{th}$ voiceprint recognition object, i.e., a target feature vector, β denotes the weighting coefficient, M denotes the number of pieces of speech information of each voiceprint recognition object, and $LC_{j,t-1}$ is the average value of the target feature vectors in step t. In this way, the final voiceprint recognition result is obtained, and the speech information is further optimized, so that more accurate speech information is recognized.

In the embodiments of the present application, a server performs loss optimization processing on the target speech information set and the target speech channel information, and then fuses the first voiceprint recognition result and the second voiceprint recognition result that are obtained after loss optimization processing, so that a deep network learns a method for eliminating speech channel noise and improves accuracy of voiceprint recognition.

Figure 3:
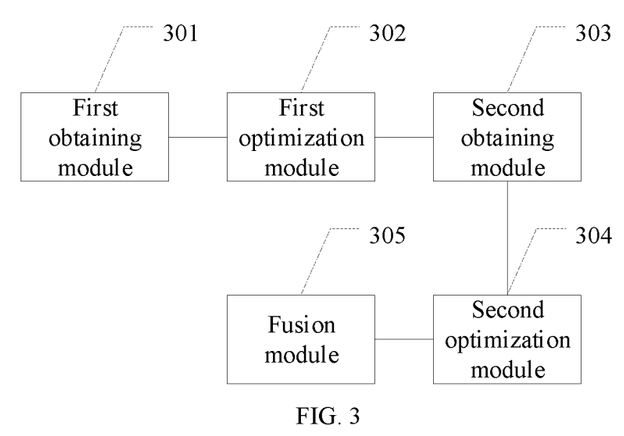
FIG. 3 is a schematic diagram of a voiceprint recognition apparatus according to an embodiment of the present application.

The voiceprint recognition method according to the embodiment of the present application is described above. A voiceprint recognition apparatus according to an embodiment of the present application is described below. Referring to FIG. 3, a voiceprint recognition apparatus in an embodiment of the present application includes:

a first obtaining module 301, configured to obtain a target speech information set to be recognized, where the target speech information set includes speech information corresponding to at least one object, and the speech information is obtained after preprocessing;

a first optimization module 302, configured to extract target feature information from the target speech information set by using a preset algorithm, and optimize the target feature information based on a first loss function to obtain a first voiceprint recognition result;

a second obtaining module 303, configured to obtain target speech channel information of a target speech channel, where the target speech channel information includes channel noise information, and the target speech channel is used to transmit the target speech information set;

a second optimization module 304, configured to extract target feature vectors in the channel noise information, and optimize the target feature vectors based on a second loss function to obtain a second voiceprint recognition result; and a fusion module 305, configured to fuse the first voiceprint recognition result and the second voiceprint recognition result to determine a final voiceprint recognition result.

In the embodiments of the present application, a server performs loss optimization processing on the target speech information set and the target speech channel information, and then fuses the first voiceprint recognition result and the second voiceprint recognition result that are obtained after loss optimization processing, so that a deep network learns a method for eliminating speech channel noise and improves accuracy of voiceprint recognition. It should be noted that to further ensure privacy and security of the target speech information set, the foregoing target speech information set may be further stored in a node of a blockchain.

Figure 4:
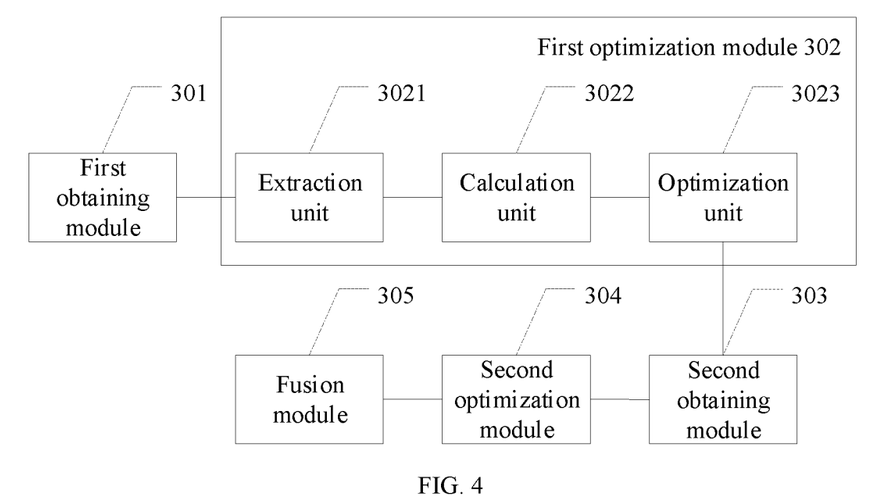
FIG. 4 is a schematic diagram of a voiceprint recognition apparatus according to another embodiment of the present application.

Referring to FIG. 4, a voiceprint recognition apparatus according to another embodiment of the present application includes:

a first obtaining module 301, configured to obtain a target speech information set to be recognized, where the target speech information set includes speech information corresponding to at least one object, and the speech information is obtained after preprocessing;

a first optimization module 302, configured to extract target feature information from the target speech information set by using a preset algorithm, and optimize the target feature information based on a first loss function to obtain a first voiceprint recognition result;

a second obtaining module 303, configured to obtain target speech channel information of a target speech channel, where the target speech channel information includes channel noise information, and the target speech channel is used to transmit the target speech information set;

a second optimization module 304, configured to extract target feature vectors in the channel noise information, and optimize the target feature vectors based on a second loss function to obtain a second voiceprint recognition result; and a fusion module 305, configured to fuse the first voiceprint recognition result and the second voiceprint recognition result to determine a final voiceprint recognition result.

Optionally, the first optimization module 302 includes:

an extraction unit 3021, configured to extract target feature information from the target speech information set by using a preset algorithm;

a calculation unit 3022, configured to calculate similarity matrices of the target feature information based on a preset formula to obtain mapping information of the target feature information; and an optimization unit 3023, configured to optimize a loss of the target speech information set based on the mapping information and a first loss function to obtain a first voiceprint recognition result.

Optionally, the extraction unit 3021 may be further specifically configured to:

collect a speech sequence in the target speech information set by using a preset algorithm, and obtain an amplitude spectrum of the speech sequence;

filter the amplitude spectrum of the speech sequence through a filter to obtain a filter output result of the speech sequence; and perform discrete cosine transform on the filter output result of the speech sequence to obtain target feature information.

Optionally, the calculation unit 3022 may be further specifically configured to:
- transform the target feature information into a low-dimensional vector, where the low-dimensional vector is a vector representing the target feature information in a low dimension; and
- calculate the similarity matrices of the target feature information based on the low-dimensional vector and a preset formula to obtain the mapping information of the target feature information.

Optionally, the second optimization module 304 may be further specifically configured to:
- extract the target feature vectors in the channel noise information, and calculate an average value of the target feature vectors; and
- calculate a minimum mean square error matrix of the channel noise information based on the average value of the target feature vectors and the second loss function to obtain the second voiceprint recognition result.

Optionally, the fusion module 305 may be further specifically configured to:
- obtain the first voiceprint recognition result and the second voiceprint recognition result; and
- fuse the first voiceprint recognition result and the second voiceprint recognition result by using a fusion formula to determine the final voiceprint recognition result, where the fusion formula is:

$$L = L_1 + \gamma(-L_2 + \log \Sigma_{K=1}^{N} \exp(L_2)),$$

where L denotes the final voiceprint recognition result after fusion, $L_1$ denotes the first voiceprint recognition result, $L_2$ denotes the second voiceprint recognition result, k denotes the voiceprint recognition object, N denotes the number of pieces of speech information of each voiceprint recognition object, and $\gamma$ denotes an adjustment factor.

Optionally, the first obtaining module 301 may be further specifically configured to:
- obtain to-be-processed speech information, and pre-emphasize the to-be-processed speech information s(n) by using a preset processing formula to obtain processed speech information s'(n), where the preset processing formula is s'(n)=s(n)−as(n−1), where a is a pre-emphasis coefficient, and s(n−1) is a previous piece of speech information of the to-be-processed speech information; and
- perform framing on the processed speech information, and window each frame of the processed speech information to obtain a target speech information set, where the target speech information set includes speech information corresponding to at least one object.

In the embodiments of the present application, a server performs loss optimization processing on the target speech information set and the target speech channel information, and then fuses the first voiceprint recognition result and the second voiceprint recognition result that are obtained after loss optimization processing, so that a deep network learns a method for eliminating speech channel noise and improves accuracy of voiceprint recognition.

The voiceprint recognition apparatus in the embodiment of the present application is described in detail above from the perspective of modular functional entities with reference to FIG. 3 and FIG. 4. A voiceprint recognition device in an embodiment of the present application is described in detail below from the perspective of hardware processing.

Figure 5:
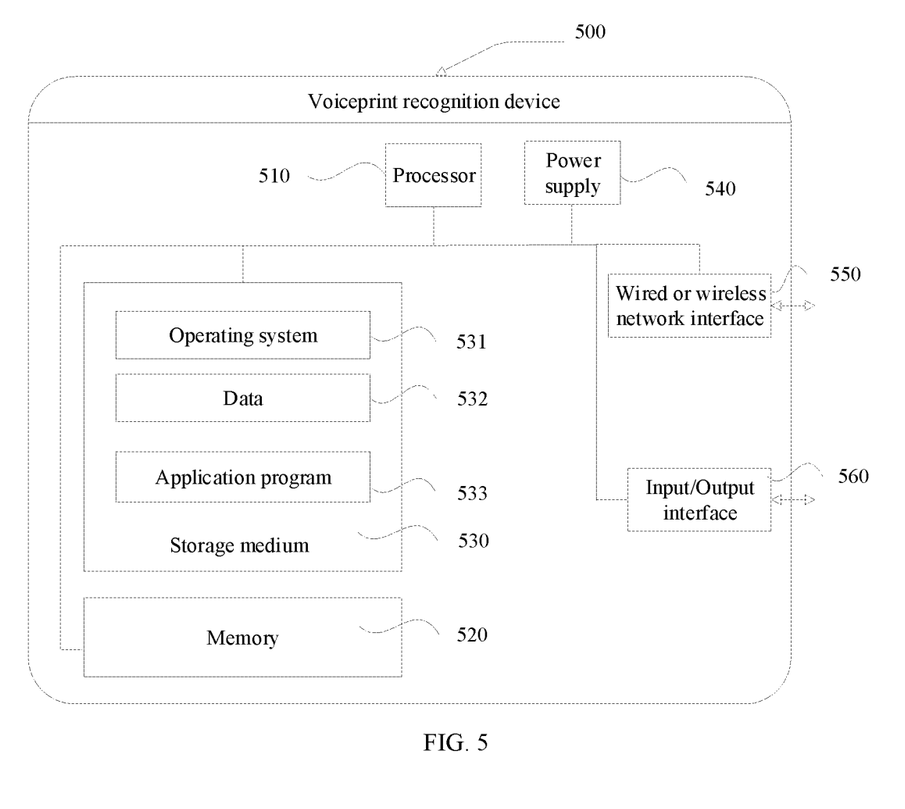
FIG. 5 is a schematic diagram of a voiceprint recognition device according to an embodiment of the present application.

FIG. 5 is a schematic structural diagram of a voiceprint recognition device according to an embodiment of the present application. The voiceprint recognition device 500 may have relatively large differences due to a configuration or performance difference and may include one or more processors (central processing units (CPUs)) 510, a memory 520, and one or more storage media 530 (such as one or more mass storage devices) that store an application program 533 or data 532. The memory 520 and the storage medium 530 may be used for short-time storage or persistent storage. The program stored in the storage medium 530 may include one or more modules (not shown in the figure), and each module may include a series of operation instructions in the voiceprint recognition device 500. Further, the processor 510 may be configured to communicate with the storage medium 530, and execute a series of operation instructions in the storage medium 530 on the voiceprint recognition device 500.

The voiceprint recognition device 500 may further include one or more power supplies 540, one or more wired or wireless network interfaces 550, one or more input/output interfaces 560, and/or one or more operating systems 531, such as Windows Server, Mac OS X, Unix, Linux and FreeBSD. It can be understood by a person skilled in the art that the structure of the voiceprint recognition device shown in FIG. 5 does not constitute a limitation to the voiceprint recognition device, and may include more or fewer components than those shown, or combine some components, or have different component arrangements.

The present application further provides a voiceprint recognition device, including: a memory and at least one processor, where the memory stores instructions, and the memory and the at least one processor are interconnected by a line; and the at least one processor invokes the instructions in the memory to enable the voiceprint recognition device to perform the steps of the foregoing voiceprint recognition method.

The present application further provides a computer-readable storage medium. The computer-readable storage medium may be a non-volatile computer-readable storage medium or a volatile computer-readable storage medium. The computer-readable storage medium stores computer instructions, and when the computer instructions are run on a computer, the computer is enabled to perform the following steps:
- obtaining a target speech information set to be recognized, where the target speech information set includes speech information corresponding to at least one object, and the speech information is obtained after preprocessing;
- extracting target feature information from the target speech information set by using a preset algorithm, and optimizing the target feature information based on a first loss function to obtain a first voiceprint recognition result;
- obtaining target speech channel information of a target speech channel, where the target speech channel information includes channel noise information, and the target speech channel is used to transmit the target speech information set;
- extracting target feature vectors in the channel noise information, and optimizing the target feature vectors based on a second loss function to obtain a second voiceprint recognition result; and
- fusing the first voiceprint recognition result and the second voiceprint recognition result to determine a final voiceprint recognition result.

A person skilled in the art can clearly understand that for ease and brevity of description, for specific working processes of the system, apparatus and units described above, reference may be made to the corresponding processes in the foregoing method embodiments. Details are not repeated herein.

The blockchain described in the present application is a new application mode of computer technologies such as distributed data storage, point-to-point transmission, a consensus mechanism and an encryption algorithm. The blockchain is essentially a decentralized database, and is a series of data blocks associated using a cryptographic method. Each data block contains information about a batch of network transactions, which is used to verify the validity of the information (anti-counterfeiting) and generate the next block. The blockchain may include a blockchain underlying platform, a platform product service layer, an application service layer, etc. The integrated units may be stored in a computer-readable storage medium if implemented in the form of a software function unit and sold or used as a standalone product. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present application. The foregoing storage media include: a USB flash disk, a mobile hard disk, a read-only memory (ROM), a random access memory (RAM), a magnetic disk or an optical disc, and other media that can store program code.

The foregoing embodiments are only used to illustrate the technical solutions of the present application, rather than constitute a limitation thereto. Although the present application is described in detail with reference to the foregoing embodiments, it should be understood by a person of ordinary skill in the art that he/she may still modify the technical solutions described in the foregoing embodiments or equivalently replace some technical features therein; and these modifications or replacements do not make the essence of the corresponding technical solutions depart from the spirit and scope of the technical solutions of various embodiments of the present application.

What is claimed is:

1. A voiceprint recognition method, comprising:
    obtaining a target speech information set to be recognized, wherein the target speech information set comprises speech information corresponding to at least one object, and the speech information is obtained after a preprocessing;
    extracting target feature information from the target speech information set by using a preset algorithm, and optimizing the target feature information based on a first loss function to obtain a first voiceprint recognition result;
    obtaining target speech channel information of a target speech channel, wherein the target speech channel information comprises channel noise information, and the target speech channel is configured to transmit the target speech information set;
    extracting target feature vectors in the channel noise information, and optimizing the target feature vectors based on a second loss function to obtain a second voiceprint recognition result; and
    fusing the first voiceprint recognition result and the second voiceprint recognition result to determine a final voiceprint recognition result.

2. The voiceprint recognition method according to claim 1, wherein the target speech information set is stored in a blockchain, and the step of extracting the target feature information from the target speech information set by using the preset algorithm, and optimizing the target feature information based on the first loss function to obtain the first voiceprint recognition result comprises:
    extracting the target feature information from the target speech information set by using the preset algorithm;
    calculating similarity matrices of the target feature information based on a preset formula to obtain mapping information of the target feature information; and
    optimizing a loss of the target speech information set based on the mapping information and the first loss function to obtain the first voiceprint recognition result.

3. The voiceprint recognition method according to claim 2, wherein the step of extracting target feature information from the target speech information set by using the preset algorithm comprises:
    collecting a speech sequence in the target speech information set by using the preset algorithm, and obtaining an amplitude spectrum of the speech sequence;
    filtering the amplitude spectrum of the speech sequence through a filter to obtain a filter output result of the speech sequence; and
    performing a discrete cosine transform on the filter output result of the speech sequence to obtain the target feature information.

4. The voiceprint recognition method according to claim 2, wherein the step of calculating the similarity matrices of the target feature information based on the preset formula to obtain the mapping information of the target feature information comprises:
    transforming the target feature information into a low-dimensional vector, wherein the low-dimensional vector is a vector representing the target feature information in a low dimension; and
    calculating the similarity matrices of the target feature information based on the low-dimensional vector and the preset formula to obtain the mapping information of the target feature information.

5. The voiceprint recognition method according to claim 2, wherein the step of obtaining the target speech information set to be recognized, wherein the target speech information set comprises the speech information corresponding to the at least one object, and the speech information is obtained after the preprocessing comprises:
    obtaining to-be-processed speech information, and pre-emphasizing the to-be-processed speech information s(n) by using a preset processing formula to obtain processed speech information s (n), wherein the preset processing formula is s'(n)=s(n)−as(n−1), wherein a is a pre-emphasis coefficient, and s(n−1) is a previous piece of the speech information of the to-be-processed speech information; and
    performing a framing on the processed speech information, and windowing each frame of the processed speech information to obtain the target speech information set, wherein the target speech information set comprises the speech information corresponding to the at least one object.

6. The voiceprint recognition method according to claim 1, wherein the step of extracting the target feature vectors in the channel noise information, and optimizing the target feature vectors based on the second loss function to obtain the second voiceprint recognition result comprises:

extracting the target feature vectors in the channel noise information, and calculating an average value of the target feature vectors; and calculating a minimum mean square error matrix of the channel noise information based on the average value of the target feature vectors and the second loss function to obtain the second voiceprint recognition result.

7. The voiceprint recognition method according to claim 1, wherein the step of fusing the first voiceprint recognition result and the second voiceprint recognition result to determine the final voiceprint recognition result comprises:

obtaining the first voiceprint recognition result and the second voiceprint recognition result; and fusing the first voiceprint recognition result and the second voiceprint recognition result by using a fusion formula to determine the final voiceprint recognition result, wherein the fusion formula is:

$$L=L_1+\gamma(-L_2+\log \Sigma_{k=1}^{N} \exp(L_2)),$$

wherein L denotes the final voiceprint recognition result after a fusion, $L_1$ denotes the first voiceprint recognition result, $L_2$ denotes the second voiceprint recognition result, k denotes voiceprint recognition objects, N denotes a number of pieces of speech information of each of the voiceprint recognition objects, and $\gamma$ denotes an adjustment factor.

8. The voiceprint recognition method according to claim 1, wherein the step of obtaining the target speech information set to be recognized, wherein the target speech information set comprises the speech information corresponding to the at least one object, and the speech information is obtained after the preprocessing comprises:

obtaining to-be-processed speech information, and pre-emphasizing the to-be-processed speech information s(n) by using a preset processing formula to obtain processed speech information s'(n), wherein the preset processing formula is s'(n)=s(n)−as(n−1), wherein a is a pre-emphasis coefficient, and s(n−1) is a previous piece of the speech information of the to-be-processed speech information; and performing a framing on the processed speech information, and windowing each frame of the processed speech information to obtain the target speech information set, wherein the target speech information set comprises the speech information corresponding to the at least one object.

9. A voiceprint recognition device, comprising a memory, a processor, and a computer program stored in the memory and executable on the processor, wherein the processor implements the following steps when executing the computer program:

obtaining a target speech information set to be recognized, wherein the target speech information set comprises speech information corresponding to at least one object, and the speech information is obtained after a preprocessing;

extracting target feature information from the target speech information set by using a preset algorithm, and optimizing the target feature information based on a first loss function to obtain a first voiceprint recognition result;

obtaining target speech channel information of a target speech channel, wherein the target speech channel information comprises channel noise information, and the target speech channel is configured to transmit the target speech information set;

extracting target feature vectors in the channel noise information, and optimizing the target feature vectors based on a second loss function to obtain a second voiceprint recognition result; and fusing the first voiceprint recognition result and the second voiceprint recognition result to determine a final voiceprint recognition result.

10. The voiceprint recognition device according to claim 9, wherein the processor implements the following steps when executing the computer program:

extracting the target feature information from the target speech information set by using the preset algorithm;

calculating similarity matrices of the target feature information based on a preset formula to obtain mapping information of the target feature information; and optimizing a loss of the target speech information set based on the mapping information and the first loss function to obtain the first voiceprint recognition result.

11. The voiceprint recognition device according to claim 10, wherein the processor implements the following steps when executing the computer program:

collecting a speech sequence in the target speech information set by using the preset algorithm, and obtaining an amplitude spectrum of the speech sequence;

filtering the amplitude spectrum of the speech sequence through a filter to obtain a filter output result of the speech sequence; and performing a discrete cosine transform on the filter output result of the speech sequence to obtain the target feature information.

12. The voiceprint recognition device according to claim 10, wherein the processor implements the following steps when executing the computer program:

transforming the target feature information into a low-dimensional vector, wherein the low-dimensional vector is a vector representing the target feature information in a low dimension; and calculating the similarity matrices of the target feature information based on the low-dimensional vector and the preset formula to obtain the mapping information of the target feature information.

13. The voiceprint recognition device according to claim 9, wherein the processor implements the following steps when executing the computer program:

extracting the target feature vectors in the channel noise information, and calculating an average value of the target feature vectors; and calculating a minimum mean square error matrix of the channel noise information based on the average value of the target feature vectors and the second loss function to obtain the second voiceprint recognition result.

14. The voiceprint recognition device according to claim 9, wherein the processor implements the following steps when executing the computer program:

obtaining the first voiceprint recognition result and the second voiceprint recognition result; and fusing the first voiceprint recognition result and the second voiceprint recognition result by using a fusion formula to determine the final voiceprint recognition result, wherein the fusion formula is:

$$L=L_1+\gamma(-L_2+\log \Sigma_{k=1}^{N} \exp(L_2)),$$

wherein L denotes the final voiceprint recognition result after a fusion, $L_1$ denotes the first voiceprint recognition result, $L_2$ denotes the second voiceprint recognition result, k denotes voiceprint recognition objects, N denotes a number of pieces of speech information of each of the voiceprint recognition objects, and γ denotes an adjustment factor.

15. The voiceprint recognition device according to claim 9, wherein the processor further implements the following steps when executing the computer program:
obtaining to-be-processed speech information, and pre-emphasizing the to-be-processed speech information s(n) by using a preset processing formula to obtain processed speech information s'(n), wherein the preset processing formula is s'(n)=s(n)−as(n−1), wherein a is a pre-emphasis coefficient, and s(n−1) is a previous piece of the speech information of the to-be-processed speech information; and
performing a framing on the processed speech information, and windowing each frame of the processed speech information to obtain the target speech information set, wherein the target speech information set comprises the speech information corresponding to the at least one object.

16. A non-transitory computer-readable storage medium, wherein the non-transitory computer-readable storage medium stores computer instructions, and when the computer instructions are run on a computer, the computer is enabled to perform the following steps:
obtaining a target speech information set to be recognized, wherein the target speech information set comprises speech information corresponding to at least one object, and the speech information is obtained after a preprocessing;
extracting target feature information from the target speech information set by using a preset algorithm, and optimizing the target feature information based on a first loss function to obtain a first voiceprint recognition result;
obtaining target speech channel information of a target speech channel, wherein the target speech channel information comprises channel noise information, and the target speech channel is configured to transmit the target speech information set;
extracting target feature vectors in the channel noise information, and optimizing the target feature vectors based on a second loss function to obtain a second voiceprint recognition result; and
fusing the first voiceprint recognition result and the second voiceprint recognition result to determine a final voiceprint recognition result.

17. The non-transitory computer-readable storage medium according to claim 16, wherein when the computer instructions are run on the computer, the computer is further enabled to perform the following steps:
extracting the target feature information from the target speech information set by using the preset algorithm;
calculating similarity matrices of the target feature information based on a preset formula to obtain mapping information of the target feature information; and
optimizing a loss of the target speech information set based on the mapping information and the first loss function to obtain the first voiceprint recognition result.

18. The non-transitory computer-readable storage medium according to claim 17, wherein when the computer instructions are run on the computer, the computer is further enabled to perform the following steps:
collecting a speech sequence in the target speech information set by using the preset algorithm, and obtaining an amplitude spectrum of the speech sequence;
filtering the amplitude spectrum of the speech sequence through a filter to obtain a filter output result of the speech sequence; and
performing a discrete cosine transform on the filter output result of the speech sequence to obtain the target feature information.

19. The non-transitory computer-readable storage medium according to claim 17, wherein when the computer instructions are run on the computer, the computer is further enabled to perform the following steps:
transforming the target feature information into a low-dimensional vector, wherein the low-dimensional vector is a vector representing the target feature information in a low dimension; and
calculating the similarity matrices of the target feature information based on the low-dimensional vector and the preset formula to obtain the mapping information of the target feature information.

20. The non-transitory computer-readable storage medium according to claim 16, wherein when the computer instructions are run on the computer, the computer is further enabled to perform the following steps:
extracting the target feature vectors in the channel noise information, and calculating an average value of the target feature vectors; and
calculating a minimum mean square error matrix of the channel noise information based on the average value of the target feature vectors and the second loss function to obtain the second voiceprint recognition result.

* * * * *